UNITED STATES PATENT OFFICE.

HENRY A. DANIELS, OF YONKERS, NEW YORK.

ARTIFICIAL STONE.

SPECIFICATION forming part of Letters Patent No. 346,732, dated August 3, 1886.

Application filed January 15, 1886. Serial No. 188,676. (No specimens.)

*To all whom it may concern:*

Be it known that I, HENRY A. DANIELS, a citizen of the United States, and a resident of Yonkers, in the county of Westchester and State of New York, have invented certain new and useful Improvements in Artificial Stone, of which the following is a specification.

My invention is an improved artificial stone, consisting of sand, cement, a binding material, as glue or caoutchouc, and muriate of soda, to which in some instances may be added pearlash, soluble glass, and alum. The use of the latter substances, however, is optional. The improved composition consists, essentially, of sand, cement, a binding agent, and muriate of soda, the latter having the effect of insuring the setting and hardening of the cement, imparting greater body to the material and resulting in a more crystalline product.

In a separate application for Letters Patent, Serial No. 188,673, I have described a mode of combining the sand, cement, and a binding material—as glue, gum, or caoutchouc—and I need not, therefore, refer specially to the same here, and will merely state that I preferably employ the sand and cement in the proportions of, say, ten pounds of sand and five of cement, dissolve one-quarter of a pound of the binding material in a gallon of suitable solvent liquid, and use the muriate of soda by dissolving three ounces thereof in water and adding it to the solution, which is then mixed with the dry material in sufficient quantities to form a paste. When pearlash and alum are used, they are also dissolved, and when soluble glass is employed it is added to the solution before the latter is combined with the dry materials.

Without limiting myself to the precise proportions specified, I claim—

An artificial stone consisting of sand, cement, a binding agent, as caoutchouc, and muriate of soda, substantially as set forth.

In testimony whereof I have signed my name to this specification in the presence of two subscribing witnesses.

HENRY A. DANIELS.

Witnesses:
HARRY M. DICKINSON,
H. P. STAMFORD.